United States Patent
Matsumura

(10) Patent No.: US 12,278,394 B2
(45) Date of Patent: Apr. 15, 2025

(54) FLEXIBLE BUS BAR, COMPOSITE BUS BAR, POWER STORAGE PACK, AND METHOD FOR MANUFACTURING FLEXIBLE BUS BAR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Nobuyuki Matsumura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 470 days.

(21) Appl. No.: 17/634,173

(22) PCT Filed: Aug. 6, 2020

(86) PCT No.: PCT/JP2020/030171
§ 371 (c)(1),
(2) Date: Feb. 9, 2022

(87) PCT Pub. No.: WO2021/039344
PCT Pub. Date: Mar. 4, 2021

(65) Prior Publication Data
US 2022/0320686 A1 Oct. 6, 2022

(30) Foreign Application Priority Data
Aug. 27, 2019 (JP) ................. 2019-154811

(51) Int. Cl.
*H01M 50/505* (2021.01)
*H01M 50/249* (2021.01)

(52) U.S. Cl.
CPC ....... *H01M 50/505* (2021.01); *H01M 50/249* (2021.01); *H01M 2220/20* (2013.01)

(58) Field of Classification Search
CPC ............ H01M 50/505; H01M 50/249; H01M 2220/20; H01M 50/507; H01M 50/209;
(Continued)

(56) References Cited

U.S. PATENT DOCUMENTS 6,264,510 B1 * 7/2001 Onizuka ................ H05K 3/328
439/876
8,628,335 B1 1/2014 Zhao
(Continued)

FOREIGN PATENT DOCUMENTS

| JP | 06-140020 | 5/1994 |
|---|---|---|
| JP | 2012-243689 | 12/2012 |
| JP | 2014-532269 | 12/2014 |
| JP | 2015-537357 | 12/2015 |
| JP | 2017-216095 | 12/2017 |
| JP | 2018-181780 | 11/2018 |

OTHER PUBLICATIONS

International Search Report issued in International Bureau of WIPO Patent Application No. PCT/JP2020/030171, dated Sep. 24, 20220, along with an English translation thereof.

*Primary Examiner* — Abdullah A Riyami
*Assistant Examiner* — Nader J Alhawamdeh
(74) *Attorney, Agent, or Firm* — Greenblum & Bernstein, P.L.C.

(57) ABSTRACT

Provided is a flexible bus bar including at least one folded portion in which one metal member is folded, and a plurality of laminated portions laminated via the folded portion, in which side edges of the plurality of laminated portions (Continued)

provided with the folded portion is formed include a cut portion in which a portion other than the folded portion has been cut.

9 Claims, 12 Drawing Sheets

(58) Field of Classification Search
CPC .. H01M 50/50; H01M 50/503; H01M 50/516; H01M 50/522; H01R 35/02; Y02E 60/10; H01G 2/02; H01G 11/12; H01G 11/84
See application file for complete search history.

(56) References Cited

U.S. PATENT DOCUMENTS

| | | | |
|---|---|---|---|
| 9,023,499 B2* | 5/2015 | Takase | H01M 50/507 |
| | | | 429/90 |
| 2013/0089996 A1 | 4/2013 | Zhao | |
| 2015/0087182 A1 | 3/2015 | Zhao et al. | |
| 2015/0171401 A1 | 6/2015 | Kim et al. | |
| 2016/0128215 A1* | 5/2016 | Kanzaki | H05K 5/0082 |
| | | | 361/752 |
| 2017/0062789 A1 | 3/2017 | Sim et al. | |
| 2018/0097472 A1* | 4/2018 | Anderson | H02S 40/36 |
| 2018/0309281 A1 | 10/2018 | Ichikawa et al. | |
| 2022/0320686 A1* | 10/2022 | Matsumura | H01M 50/505 |

* cited by examiner

FLEXIBLE BUS BAR, COMPOSITE BUS BAR, POWER STORAGE PACK, AND METHOD FOR MANUFACTURING FLEXIBLE BUS BAR

TECHNICAL FIELD

The present disclosure relates to a flexible bus bar, a composite bus bar, a power storage pack, and a method for manufacturing a flexible bus bar.

BACKGROUND ART

Conventionally, a bus bar disclosed in JP H6-140020A is known as a bus bar connected to a battery constituting a power source of an electric car, a hybrid car, and the like. This bus bar is formed by laminating a plurality of metal plates. Connection portions to be connected to electrodes of the battery are formed at two end portions of the laminated metal plates while being integrated with metal plate members. As a result of the metal plate members deforming, dimensional tolerance between the batteries can be handled.

CITATION LIST

Patent Document

Patent Document 1: JP H6-140020A

SUMMARY OF INVENTION

Problem to be Solved by Invention

With the above configuration, unless tweaks are made for grouping the plurality of metal plate members when manufacturing the bus bar, the plurality of metal plate members may separate from each other.

The present disclosure has been completed in view of the above-described circumstances, and an object of the present disclosure is to provide a technique related to a flexible bus bar with which a plurality of metal plate members can be kept from separating from each other during manufacturing.

Solution to Problem

A flexible bus bar according to the present disclosure is a flexible bus bar including at least one folded portion in which one metal plate member is folded, and a plurality of laminated portions that are laminated via the folded portion, and side edges of the plurality of laminated portions provided with the folded portion include a cut portion from which a portion other than the folded portion is cut.

Advantageous Effects of Invention

According to the present disclosure, metal plate members can be kept from separating from each other when manufacturing a flexible bus bar.

EMBODIMENTS OF INVENTION

Description of Embodiments

Figure 1:
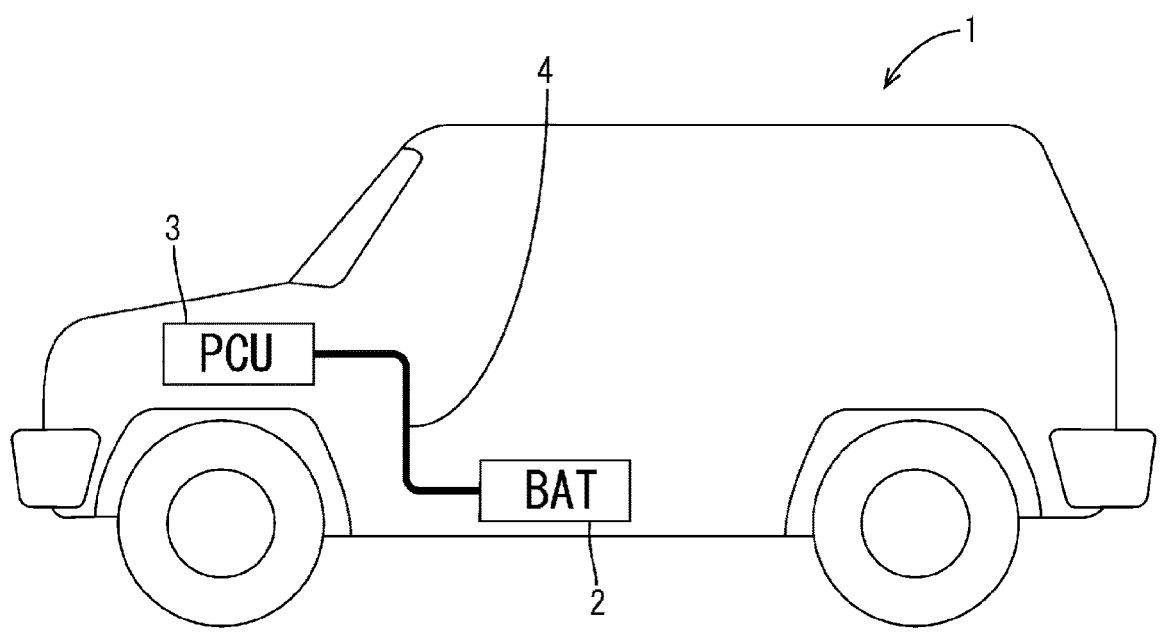
FIG. 1 is a schematic diagram showing a vehicle in which a power storage module according to a first embodiment is mounted.

First, aspects of the present disclosure will be listed and described.

(1) The present disclosure relates to a flexible bus bar including at least one folded portion in which one metal plate member is folded, and a plurality of laminated portions that are laminated via the folded portion, and side edges of the plurality of laminated portions provided with the folded portion include a cut portion from which a portion other than the folded portion is cut.

Since the flexible bus bar can easily bend as a result of having a plurality of laminated portions, the flexible bus bar can bend and deform in accordance with the tolerance between the power storage elements.

Since the plurality of laminated portions are linked by the folded portions, the plurality of laminated portions can be kept from separating from each other in the manufacturing process of the flexible bus bar.

Portions of the side edges of the plurality of laminated portions are folded portions, and the remaining portions are cut. In this manner, since the plurality of laminated portions in portions different from the folded portions are not linked to each other, such portions can be move freely. As a result, since the flexible bus bar can easily bend, tolerance between the power storage elements can be easily handled.

(2) It is preferable that the metal plate member includes a plurality of the bending portions as a result of the metal plate member being folded two or more times.

The more the metal plate member is folded, the smaller the cross-section secondary moment of the flexible bus bar, and thus the flexible bus bar can easily bend and deform.

(3) It is preferable that the folded portion is formed at a portion near an end portion of a side edge provided with the folded portion, of the side edges of the plurality of laminated portions.

Since portions near the end portions of the plurality of laminated portions are linked by the folded portions, the plurality of laminated portions can be easily grouped.

(4) It is preferable that the folded portion is formed at a center position of a side edge provided with the folded portion, of the side edges of the plurality of laminated portions.

Since the bendability of the two end portions of the flexible bus bar is improved, the flexibility of the flexible bus bar is improved.

(5) It is preferable that a bent portion that bends, in the shape of a protrusion, in a direction intersecting a thickness direction of the plurality of laminated portions is formed in the plurality of laminated portions.

Due to the bent portion stretching and contracting, tolerance of the power storage elements can be handled.

(6) It is preferable that the flexible bus bar is a vehicle bus bar to be mounted and used in a vehicle.

(7) A composite bus bar according to the present disclosure includes the flexible bus bar according to any one of the above (1) to (6), and an end portion bus bar that is connected to an end portion of the flexible bus bar.

Due to the end portion bus bar being connected to an external output terminal of the power storage module, the plurality of power storage modules can be electrically connected to each other. Due to the flexible bus bar bending and deforming, dimension tolerance between the plurality of power storage modules can be handled.

(8) It is preferable that the composite bus bar is a vehicle bus bar to be mounted and used in a vehicle.

(9) The present disclosure further relates to a power storage pack including the composite bus bar according to the above (7) or (8), and a power storage module including a plurality of power storage elements, and the end portion bus bar of the composite bus bar is connected to an external output terminal of the power storage module.

(10) It is preferable that the power storage pack is a vehicle power storage pack to be mounted and used in a vehicle.

(11) A method for manufacturing the flexible bus bar according to the present disclosure includes a step of forming a plurality of laminated portions by folding one metal plate member to form a linking portion, and a step of performing cutting so as to leave a portion of the linking portion and thereby form a folded portion using the remaining portion of the linking portion.

Since the plurality of laminated portions are linked to each other by the folded portions, the plurality of laminated portions can be kept from separating from each other during manufacturing of the flexible bus bar.

DESCRIPTION OF EMBODIMENTS OF DISCLOSURE

Hereinafter, embodiments of the present disclosure will be described. Note that the present invention is not limited to these illustrative examples and is defined by the claims, and all changes which come within the meaning and range of equivalency of the claims are intended to be embraced therein.

First Embodiment

A first embodiment in which the present disclosure is applied to a power storage pack 2 that is mounted in a vehicle 1 will be described with reference to FIGS. 1 to 6. The power storage pack 2 is mounted in the vehicle 1, which is an electric car, a hybrid car, or the like, and used as a driving source of the vehicle 1. In the following description, only a portion of a plurality of members may be given reference signs, and the reference signs of the other members may be omitted.

Overall Configuration

As shown in FIG. 1, the power storage pack 2 is arranged near the center of the vehicle 1. A PCU (Power Control Unit) 3 is arranged on the front side of the vehicle 1. The power storage pack 2 and the PCU 3 are connected by a wire harness 4. The power storage pack 2 and the wire harness 4 are connected by a connector (not shown). The power storage pack 2 includes a power storage module 11 provided with a plurality of power storage elements 12.

Power Storage Module 11

The power storage module 11 is provided with a plurality (six in the present embodiment) of power storage elements 12 and a plurality (seven in the present embodiment) flexible bus bars 10 for electrically connecting the power storage elements 12 to each other. In the following description, the direction indicated by the Z arrow is upward, the direction indicated by the Y arrow is forward, and the direction indicated by the X arrow is leftward. Note that only a portion of a plurality of identical members may be given reference signs and the reference signs of the other members may be omitted.

Figure 2:
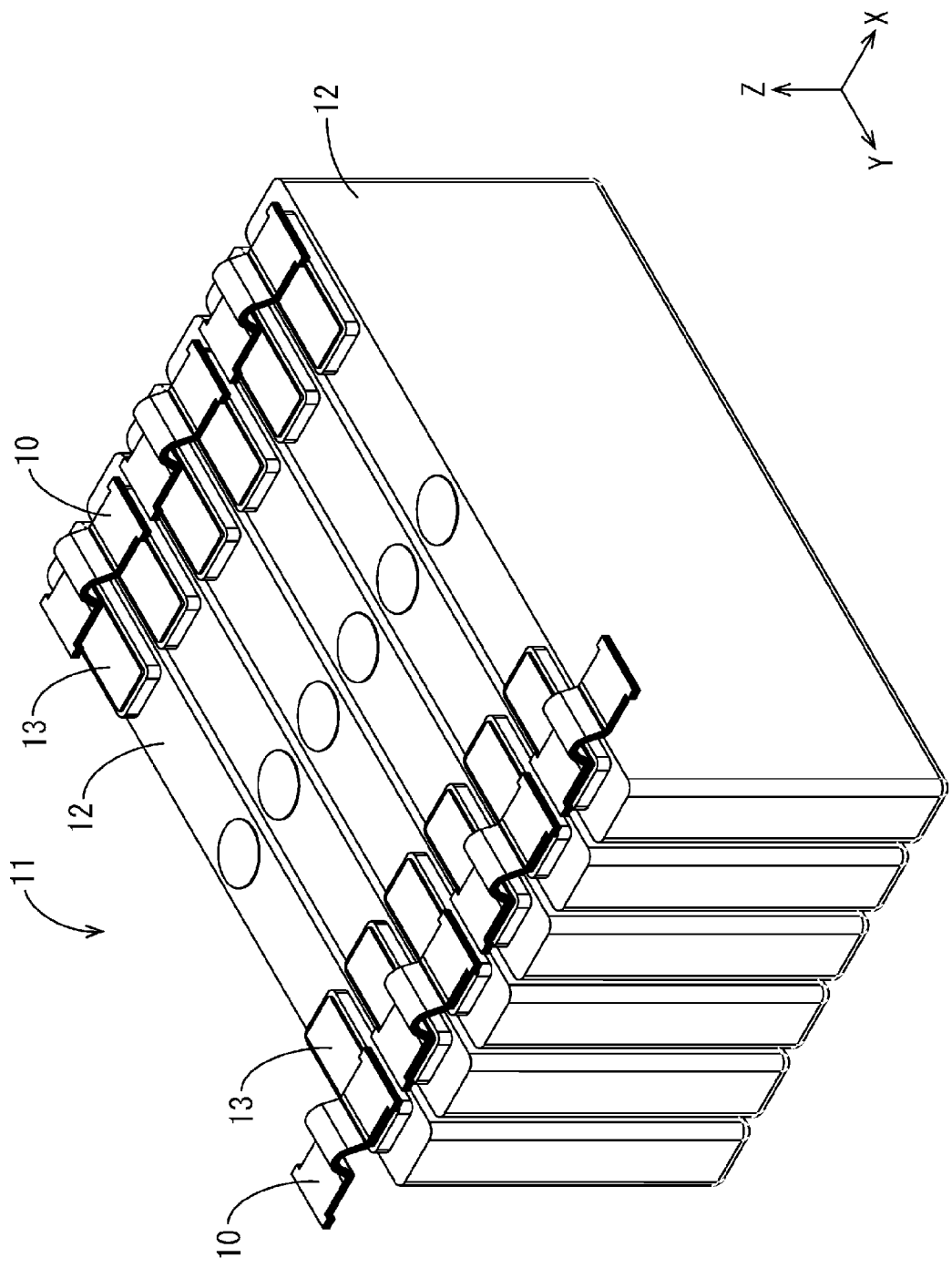
FIG. 2 is a perspective view showing the power storage module according to the first embodiment.

As shown in FIG. 2, the power storage elements 12 have a flat rectangular parallelepiped shape in the front-rear direction. The power storage elements 12 according to the present embodiment are secondary batteries. Storage elements (not shown) are housed in the power storage elements 12. Electrode terminals 13 are respectively formed at positions near the left and right ends of the upper surface of the power storage element 12. The electrode terminals 13 are electrically connected to the storage elements. One of the two electrode terminals 13 formed on each power storage element 12 is a positive electrode, and the other is a negative electrode. The electrode terminals 13 according to the present embodiment are shaped like flat plates that protrude upward.

The plurality of power storage elements 12 are arranged side by side in the left-right direction. The electrode terminals 13 of the power storage elements 12 that are adjacent to each other are connected by the flexible bus bars 10.

Flexible Bus Bar 10

Figure 3:
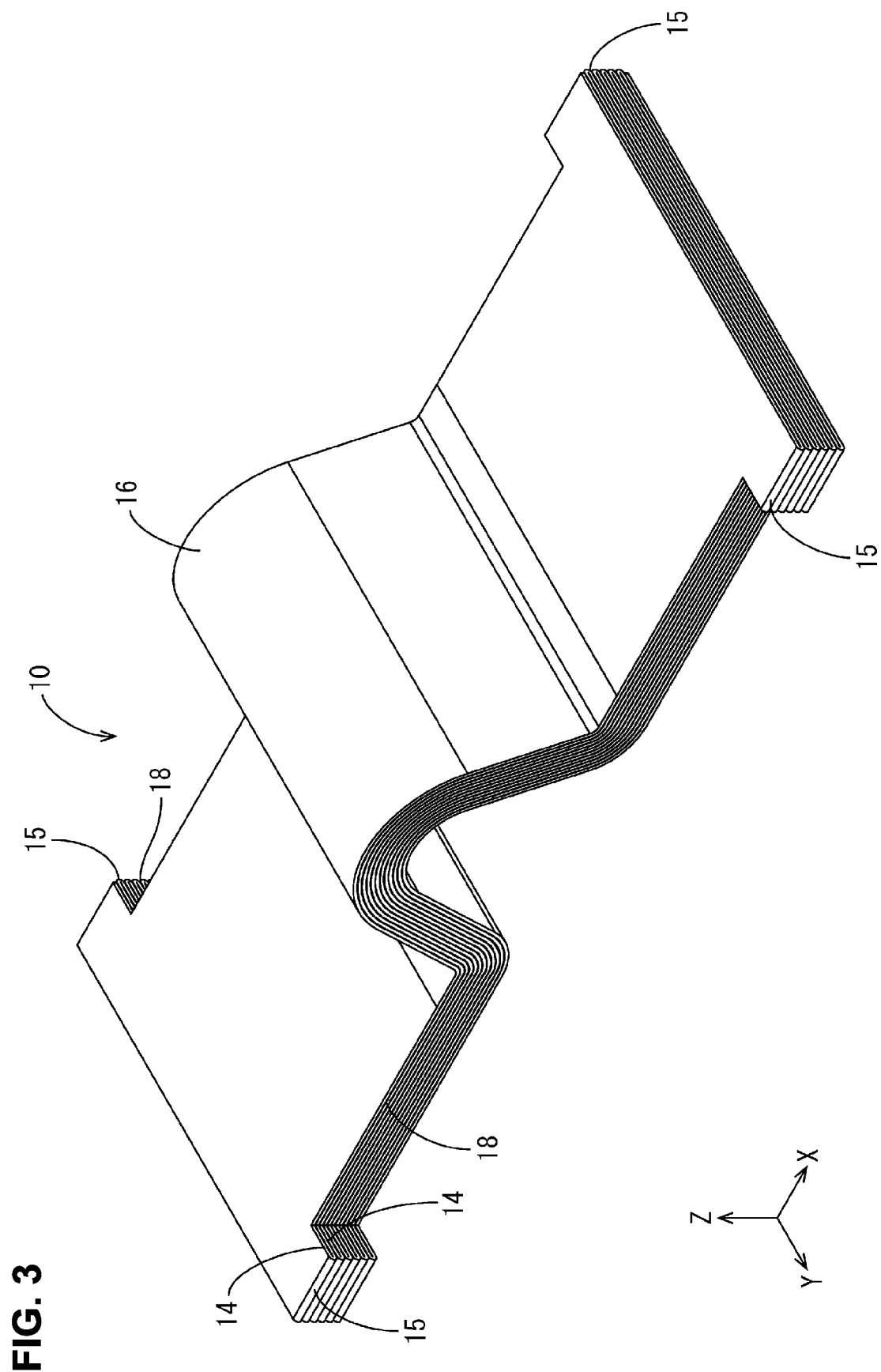
FIG. 3 is a perspective view showing a flexible bus bar.

As shown in FIG. 3, the flexible bus bar 10 is formed by pressing a metal plate member into a predetermined shape. Any metal such as copper, a copper alloy, aluminum, an aluminum alloy, nickel, a nickel alloy, or the like, can be selected as the metal that forms the metal plate member. A plating layer (not shown) may also be formed on the surface of the metal plate member. Any metal such as solder, tin, nickel, or the like, can be selected as metal that forms the plating layer.

The flexible bus bars 10 are elongated in the left-right direction. The flexible bus bars 10 are substantially rectangular as seen from above. The flexible bus bars 10 include a plurality of laminated portions 14 that are laminated in the up-down direction. The shapes of the plurality of laminated portions 14 are substantially formed into the same shape.

The laminated portions 14 that are vertically laminated are linked by folded portions 15 that are formed at positions near the left and right end portions thereof. The folded portions 15 are formed protruding forward and being folded back rearward, or protruding rearward and being folded back forward, from the laminated portions 14 that are vertically laminated. In this manner, the laminated portions 14 that are vertically laminated are in a so-called "close-contact folded state".

Each flexible bus bar 10 includes a bent portion 16 that bends upward (an example of a thickness direction of the laminated portion 14) in the shape of a protrusion at the substantially center position in the left-right direction of the flexible bus bar 10. The bent portion 16 can bend and deform so as to stretch and contract in the left-right direction. In this manner, the flexible bus bar 10 can stretch and contract in the left-right direction as a whole.

The left and right end portions of each flexible bus bar 10 are placed on and fixed to the electrode terminals 13 of the power storage elements 12. The method for fixing the flexible bus bars 10 to the electrode terminals 13 is not particularly limited, and any fixing method can be adopted such as welding such as laser welding or resistance welding, soldering, brazing-and-soldering such as brazing, or the like. In the present embodiment, the flexible bus bars 10 and the electrode terminals 13 are electrically and physically fixed to each other through laser welding.

Manufacturing Process of Power Storage Module 11

An example of a manufacturing process of the power storage module 11 will be described. The manufacturing process of the power storage module 11 is not limited to the following description.

Figure 4:
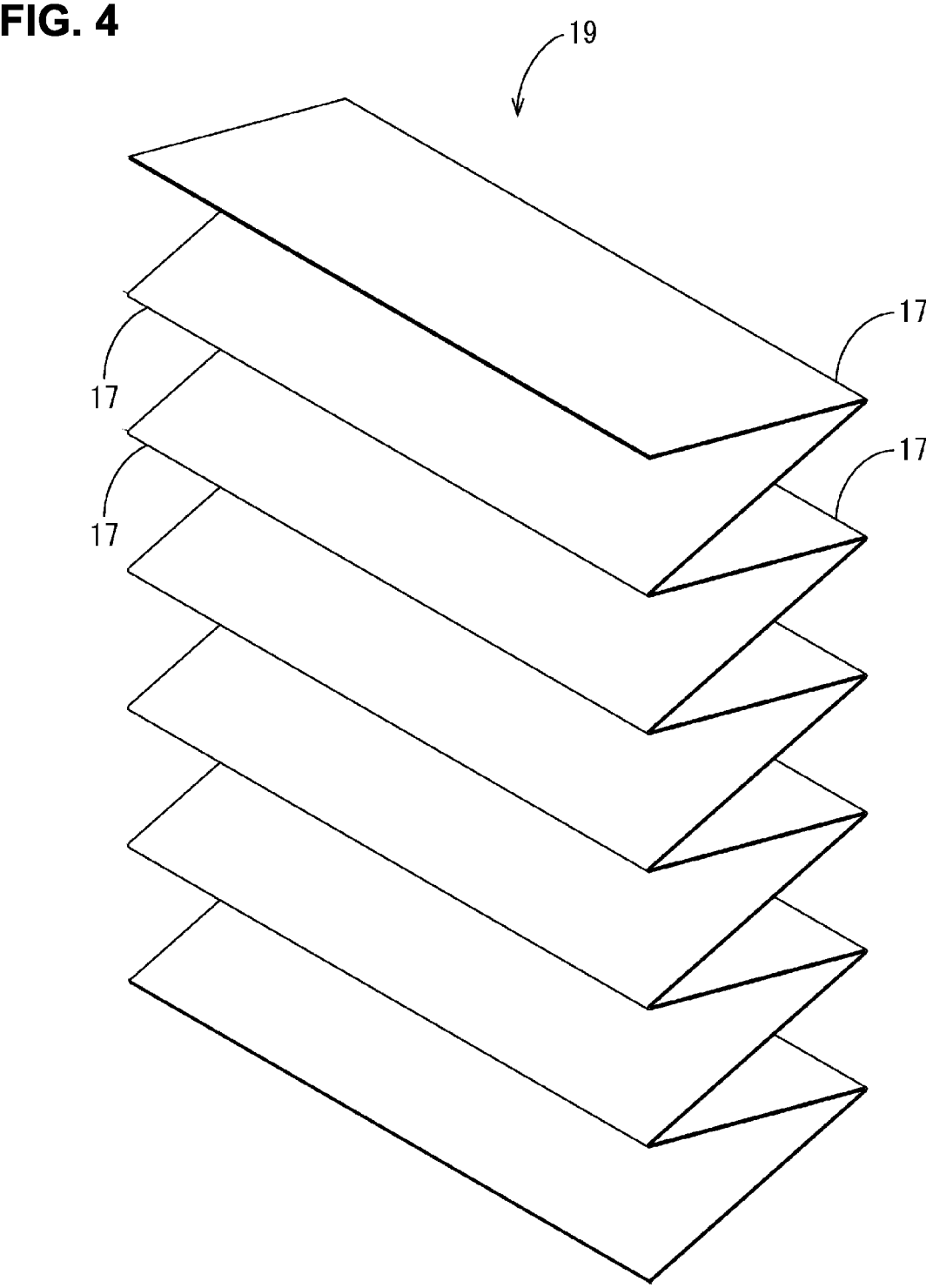
FIG. 4 is a perspective view showing a step in which a metal plate member is folded.
Figure 5:
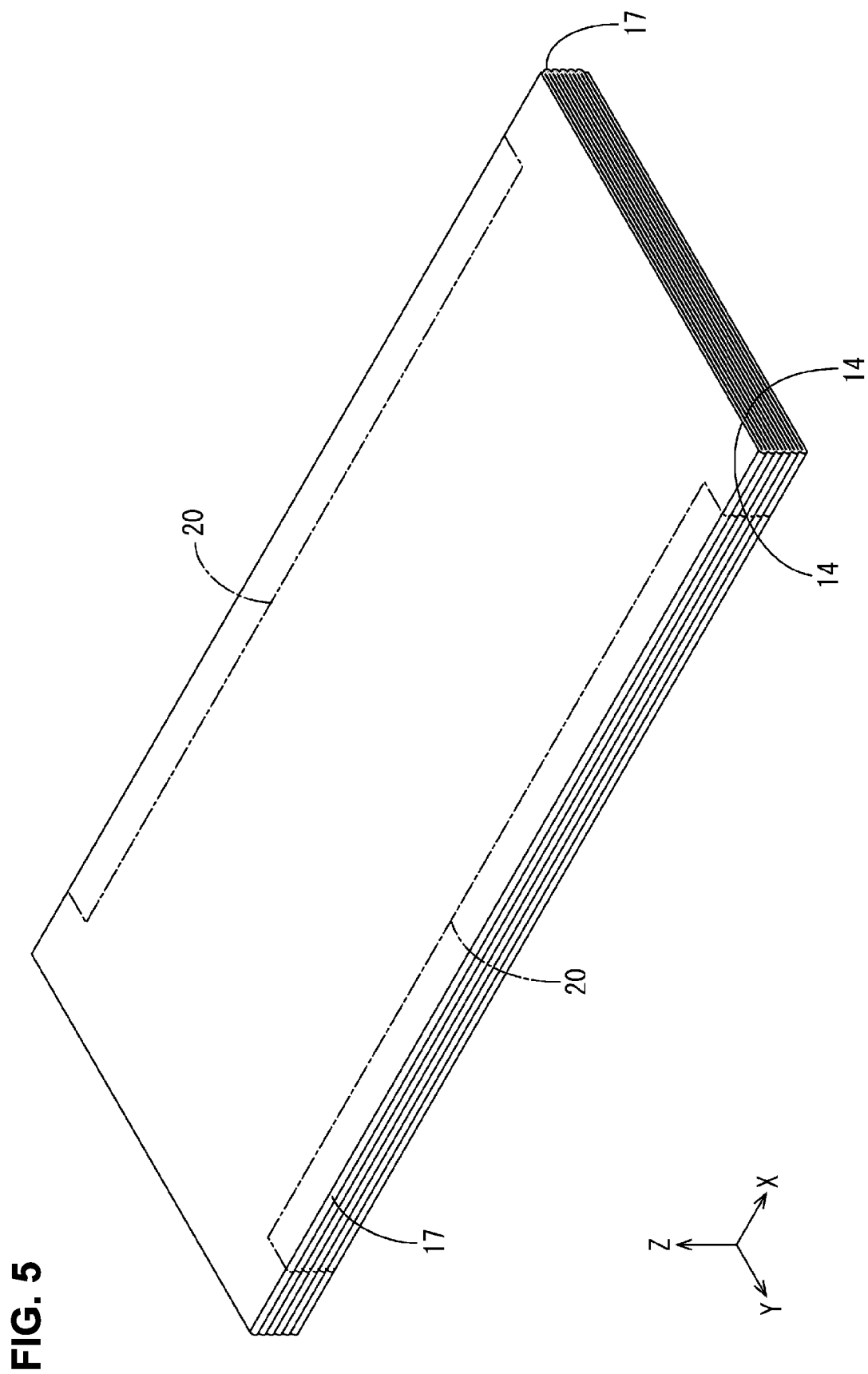
FIG. 5 is a perspective view showing a metal plate member that has been folded.

As shown in FIG. 4, an elongated metal plate member 19 is accordion-folded by being mountain-folded and valley-folded at predetermined intervals. Gaps may or may not be formed between the laminated portions 14. As shown in FIG. 5, the plurality of laminated portions 14 are laminated in a state of being linked by the linking portions 17. The laminated portions 14 are laminated in substantially close contact with each other.

Figure 6:
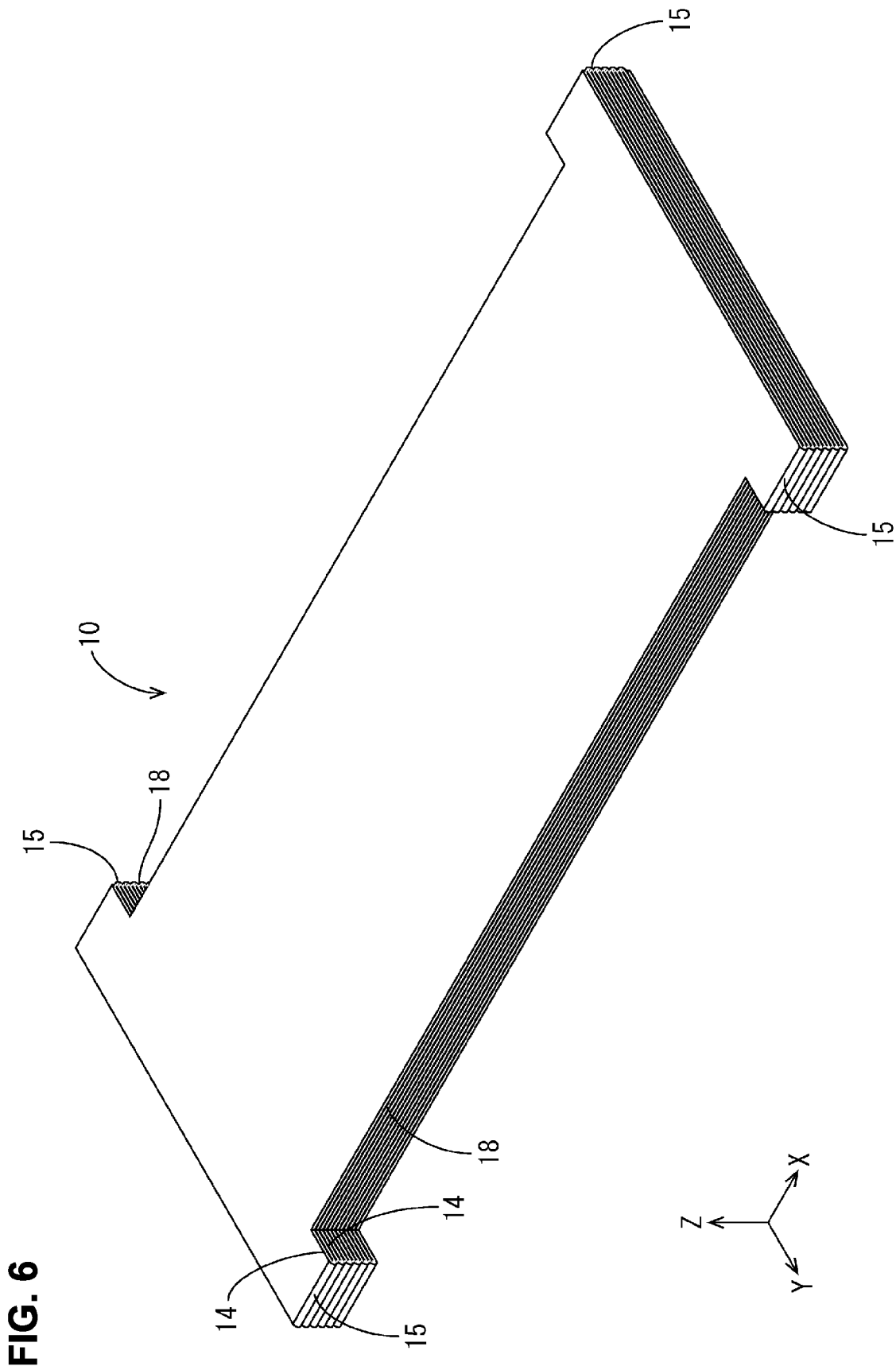
FIG. 6 is a perspective view showing a flexible bus bar in a state where cut portions have been formed.

The linking portions 17 formed at the front and rear portions of the laminated portions 14 are cut along portions indicated by dashed-dotted lines 20 shown in FIG. 5, excluding the left-and-right end portions. In this manner, as shown in FIG. 6, the folded portions 15 are formed at the left and right end portions of the laminated portions 14, and cut portions 18 are formed at side edges of the laminated portions 14 provided with the folded portions 15. In the cut portions 18, sheared surfaces formed by cutting are exposed.

The laminated portions 14 are vertically joined to each other at the folded portions 15. In this manner, the laminated portions 14 can be kept from separating from each other during manufacturing of the flexible bus bar 10. Also, portions of the laminated portions 14 other than the folded portions 15 can relatively freely deform. In this manner, the flexible bus bars 10 are formed capable of bending and deforming as a whole.

The plurality of power storage elements 12 are arranged in the front-rear direction. The flexible bus bars 10 are disposed so as to bridge adjacent electrode terminals 13. The two end portions of the flexible bus bars 10 and the electrode terminals 13 are laser-welded to each other. In this manner, a completed power storage module 11 is obtained.

Operation and Effects of Embodiment

Next, the operation and effects of the present embodiment will be described. The flexible bus bar 10 according to the present embodiment is provided with at least one folded portion 15 in which one metal plate member is bent and the plurality of laminated portions 14 laminated via the folded portions 15, and includes the cut portions 18 in which portions other than the folded portions 15 are cut at the side edges of the plurality of laminated portions 14 provided with the folded portions 15.

Dimension tolerances are set for the electrode terminals 13 of the power storage elements 12. Due to the plurality of power storage elements 12 being arranged side by side, the dimensional tolerances are accumulated. Also, the power storage elements 12 repeat expansion and contraction every time the power storage elements 12 repeat charging and discharging. For this reason, the members that connect the adjacent electrode terminals 13 to each other need to be flexible.

In the present embodiment, since the flexible bus bars 10 can easily bend as a result of having the plurality of laminated portions 14, the flexible bus bars 10 can bend and deform in accordance with the tolerance between the power storage elements 12.

Since the plurality of laminated portions 14 are linked by the folded portions 15, the plurality of laminated portions 14 can be kept from separating from each other during manufacturing of the flexible bus bars 10.

Portions of the side edges of the plurality of laminated portions 14 are the folded portions 15, and the remaining portions are cut. In this manner, since the plurality of laminated portions 14 are not linked to each other at portions excluding the folded portions 15, such portions can move freely. As a result, the flexible bus bars 10 can easily bend, and tolerance between the power storage elements 12 can be easily handled.

Also, according to the present embodiment, the plurality of folded portions 15 are provided by folding the metal plate member two or more times.

The more the metal plate member is folded, the smaller the cross-section secondary moment of the flexible bus bars 10, and thus the flexible bus bars 10 can easily bend and deform.

Also, according to the present embodiment, the folded portions 15 are formed at the portions of the plurality of laminated portions 14 that are near the end portions of the side edges provided with the folded portions 15.

Since the portions of the plurality of laminated portions 14 near the end portions are joined to each other by the folded portions 15, the plurality of laminated portions 14 can be easily grouped.

Also, according to the present embodiment, the plurality of laminated portions 14 are provided with the bent portion 16 that is bent in the shape of a protrusion in the thickness direction of the plurality of laminated portions 14.

Due to the bent portions 16 stretching and contracting, the tolerance of the power storage elements 12 can be handled.

Also, the flexible bus bars 10 according to the present embodiment are the vehicle flexible bus bars 10 that are to be mounted and used in the vehicle 1.

A manufacturing method of the flexible bus bar 10 according to the present embodiment includes a step of forming a plurality of laminated portions 14 by folding one metal plate member to form the linking portions 17, and a step of performing cutting so as to leave portions of the linking portions 17 and thereby form the folded portions 15 using the remaining portions of the linking portions 17.

Since the plurality of laminated portions 14 are linked to each other by the folded portions 15, the plurality of laminated portions 14 can be kept from separating from each other during manufacturing of the flexible bus bars 10.

Second Embodiment

Figure 7:
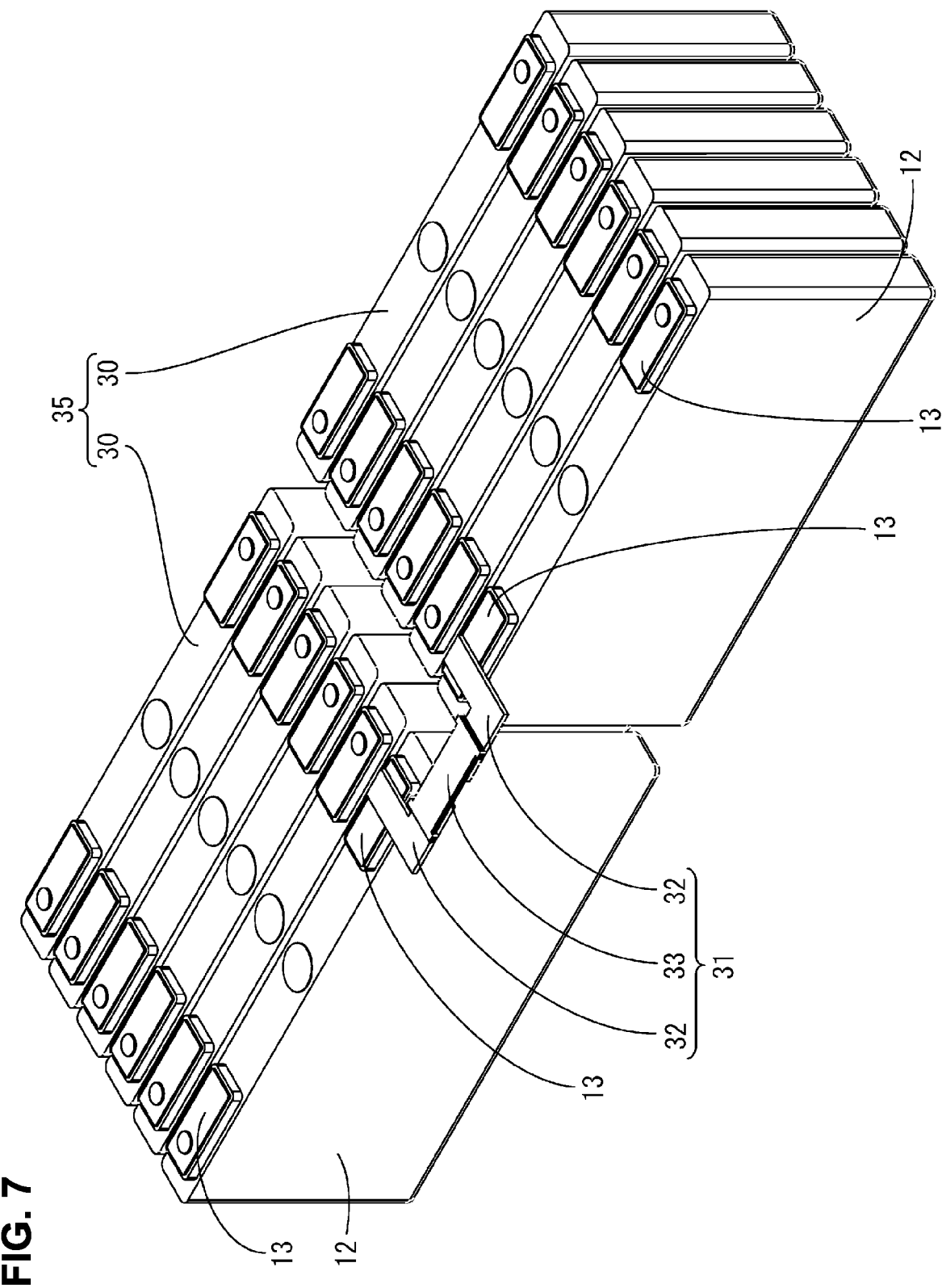
FIG. 7 is a perspective view showing a power storage pack according to a second embodiment.
Figure 8:
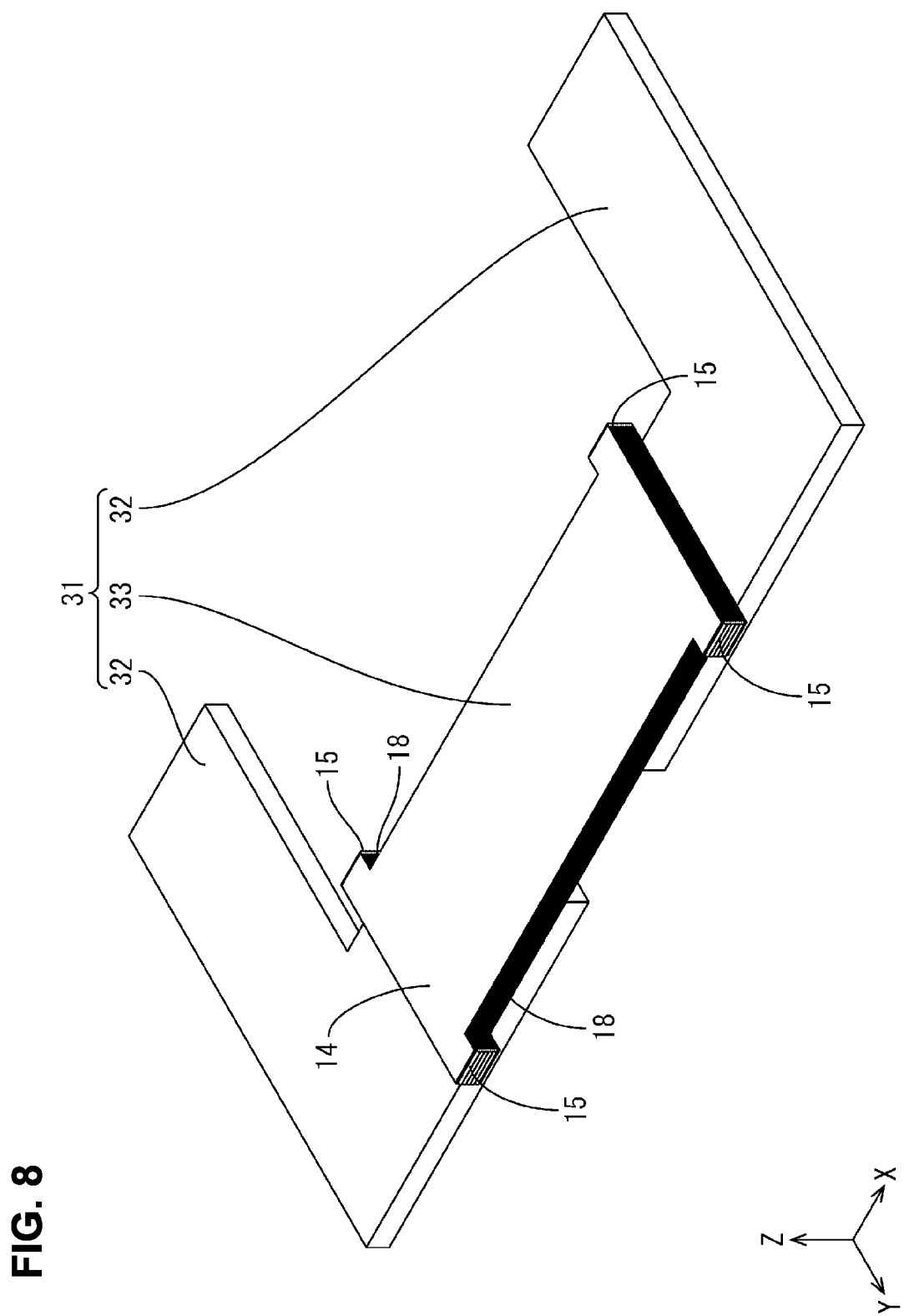
FIG. 8 is a perspective view showing a composite bus bar.

Next, a second embodiment in which a technique according to the present disclosure is applied to a power storage pack 35 will be described with reference to FIGS. 7 and 8. As shown in FIG. 7, the power storage pack 35 includes two power storage modules 30. In the present embodiment, the two power storage modules 30 are connected by a composite bus bar 31. The power storage module 30 is provided with a plurality (six in the present embodiment) of power storage elements 12 that are arranged side by side. The adjacent electrode terminals 13 are connected by bus bars (not shown). The flexible bus bar 10 described in the first embodiment, or another known bus bar may be used as the bus bar that connects power storage elements 12 to each other.

Out of the plurality of power storage elements 12 forming the power storage modules 30, electrode terminals 13 of the power storage elements 12 disposed at end portions on one side in the arrangement direction of the power storage elements 12 are connected to end portion bus bars 32 for outputting power from the power storage module 11 to an external circuit.

The method for connecting the end portion bus bars 32 and the electrode terminals 13 is not particularly limited, and any fixing method such as laser welding, welding such as resistance welding, soldering, brazing-and-soldering such as brazing may be adopted. In the present embodiment, the end portion bus bars 32 and the electrode terminals 13 are electrically and physically fixed to each other through laser welding.

The end portion bus bars 32 are formed by pressing a metal plate member into a predetermined shape. Any metal such as copper, a copper alloy, aluminum, an aluminum alloy, or the like, can be selected as the metal that forms the end portion bus bars 32. A plating layer (not shown) may also be formed on the surfaces of the end portion bus bars 32.

The shape of each end portion bus bar 32 is not particularly limited, and any shape such as a rectangle, a square, a bent crank-like shape, an L-shape, or the like can be adopted. In the present embodiment, each end portion bus bar has an L-shape as seen from above.

The end portion bus bar 32 connected to one of the power storage modules 30 of the two power storage modules 30 shown in FIG. 7 and the end portion bus bar 32 connected to the other power storage module 30 are connected to each other by a flexible bus bar 33. The flexible bus bar 33 is mounted on and fixed to end portions of each end portion bus bar 32 that are different from the end portions connected to the electrode terminals 13.

The flexible bus bar 33 according to the present embodiment is different from the flexible bus bar 10 according to the first embodiment in that the flexible bus bar 33 does not have a bent portion 16 that bends upward in the shape of a protrusion.

The method for connecting the end portion bus bars 32 to the flexible bus bar 33 is not particularly limited, and any connection method can be adopted such as welding such as laser welding or resistance welding, soldering, brazing-and-soldering such as brazing, or the like. In the present embodiment, the end portion bus bars 32 and the flexible bus bar 33 are electrically and physically fixed to each other through laser welding.

The configuration other than that described above is substantially the same as the first embodiment, the same members are given the same reference signs, and a redundant description is omitted.

The power storage modules 30 include the plurality of power storage elements 12, and thus the power storage modules 30 have a relatively large mass. For this reason, when the power storage modules 30 are fixed to the vehicle, it is difficult to finely adjust the positions of the power storage modules 30. Dimensional tolerance is set for the power storage modules 30, and assembly tolerance is set between the power storage modules 30 and the vehicle. For this reason, even if the power storage modules 30 and the vehicle are respectively fixed within their tolerances, ultimately, positional deviation occurs within the tolerances of the adjacent power storage modules 30.

The composite bus bar 31 according to the present embodiment is provided with the flexible bus bar 33 and the end portion bus bars 32 connected to the end portions of the flexible bus bar 33. Also, the power storage pack 35 according to the present embodiment is a power storage pack 35 provided with the composite bus bar 31 and the plurality of power storage elements 12, and the end portion bus bars 32 of the composite bus bar 31 are respectively connected to electrode terminals 13 of the power storage modules 30.

In this manner, as a result of the end portion bus bars 32 being connected to electrode terminals of the power storage modules 30, the plurality of power storage modules 30 can be electrically connected to each other. As a result of the flexible bus bar 33 bending and deforming, the dimensional tolerance between the plurality of power storage modules 30 can be handled.

First, the dimensional tolerances of the power storage modules 30 that are adjacent in the front-rear direction and left-right direction can be handled by shifting the power storage modules 30 in the front-rear direction and left-right direction and then welding the end portion bus bars 32 and the flexible bus bar 33, which are to be connected to the power storage modules 30, at positions in the front-rear direction and the left-right direction of the storage modules 30.

The positional deviation between the adjacent power storage modules 30 in the up-down direction can be handled by bending the flexible bus bar 33 into a moderate crank-like shape as seen from side-on.

The composite bus bar 31 according to the present embodiment is a vehicle composite bus bar 31 that is to be mounted and used in the vehicle 1. Also, the power storage pack 35 according to the present embodiment is the vehicle power storage pack 35 that is to be mounted and used in the vehicle 1.

Third Embodiment

Figure 9:
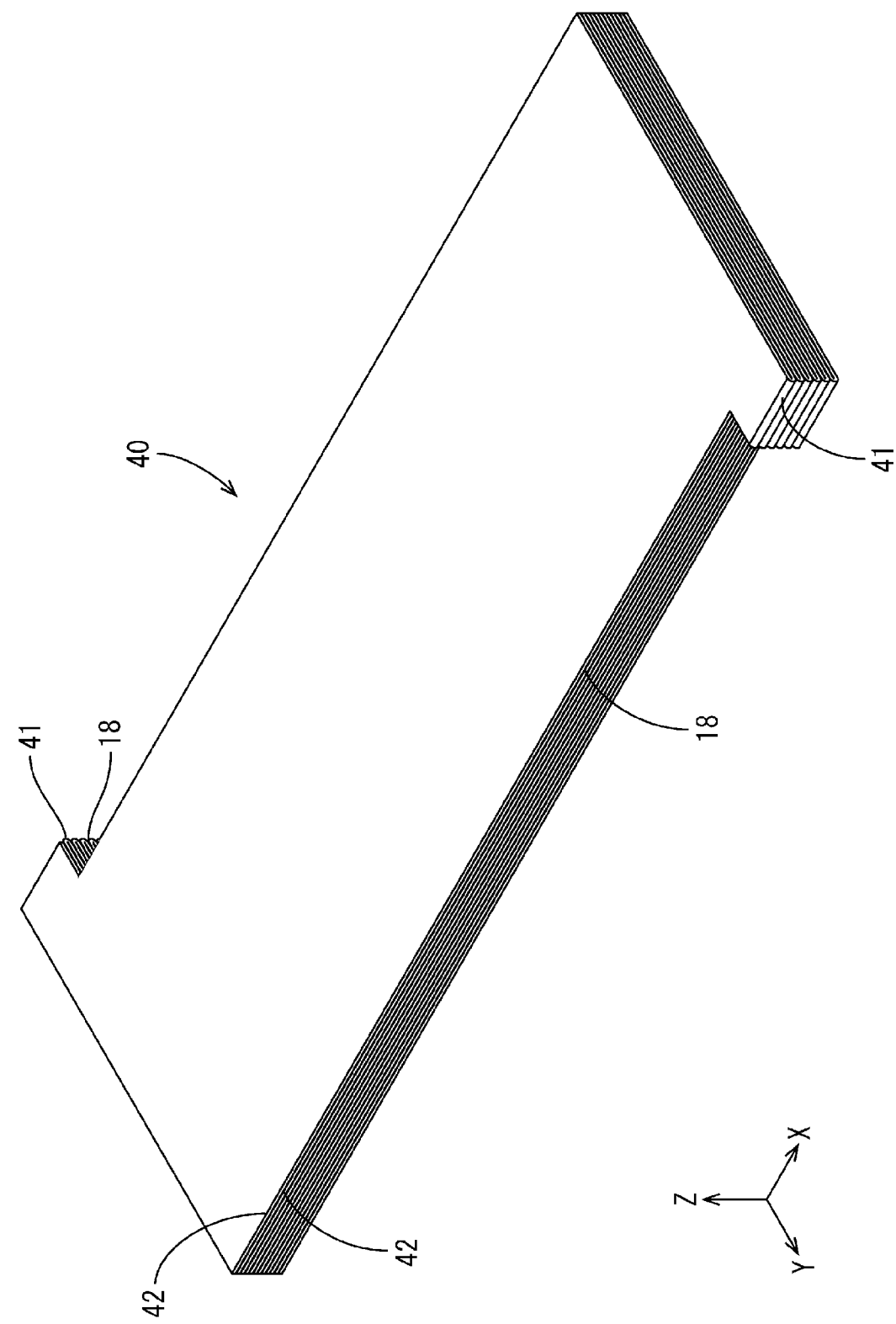
FIG. 9 is a perspective view showing a flexible bus bar according to a third embodiment.

Next, a flexible bus bar 40 according to a third embodiment will be described with reference to FIG. 9. In the flexible bus bar 40 according to the present embodiment, folded portions 41 are formed at a position closer to one end of each of the side edges provided with the folded portions 41. In the laminated portions 42, the folded portions 41 are provided diagonal to each other as seen from above. In the present embodiment, the folded portions 41 are respectively formed at the rear right end portion and the front left end portion of the laminated portions 42. The flexible bus bar 40 according to the present embodiment does not have a bent portion 16.

The configuration other than that described above is substantially the same as the first embodiment, and the same members are given the same reference signs, and the redundant description is omitted.

Since portions where the laminated portions 42 are bound to each other are smaller than a case where the folded portions 41 are formed at the two end portions of the laminated portions 42, the laminated portions 42 can easily bend and deform. In this manner, the flexibility of the flexible bus bar 40 can be improved.

Fourth Embodiment

Figure 10:
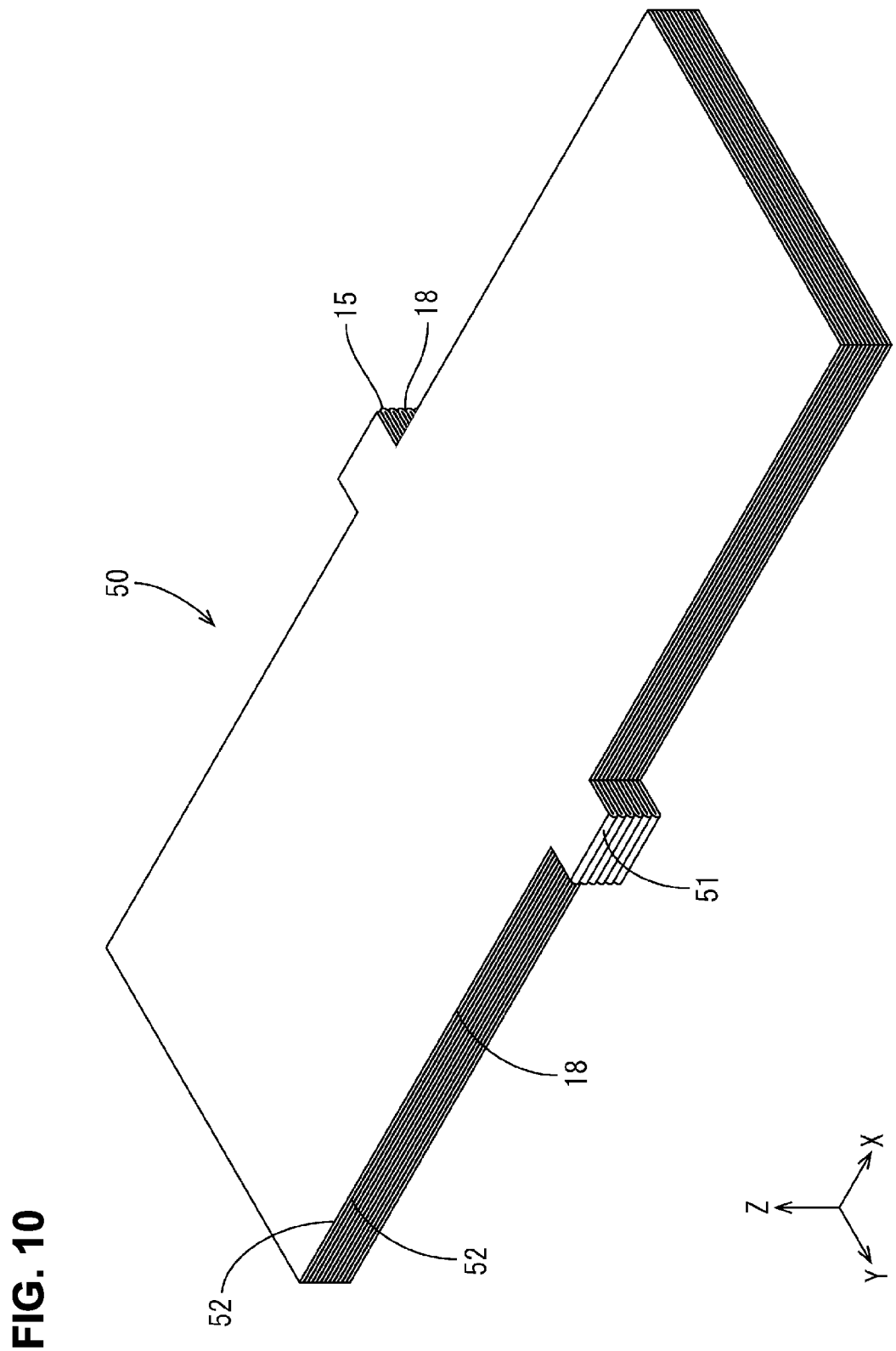
FIG. 10 is a perspective view showing a flexible bus bar according to a fourth embodiment.

Next, a flexible bus bar 50 according to a fourth embodiment will be described with reference to FIG. 10. In the flexible bus bar 50 according to the present embodiment, folded portions 51 are formed at the center position of the side edges of laminated portions 52 provided with the folded portions 51. As seen in the up-down direction, in the region of the center position in the left-right direction of the laminated portions 52, folded portions 51 protrude upward and downward. The flexible bus bar 50 according to the present embodiment does not have a bent portion 16.

The configuration other than that described above is substantially the same as the first embodiment, and the same members are given the same reference signs, and redundant description is omitted.

Compared to the case in which the folded portions 51 are formed at the two end portions of the laminated portions 52, the end portions of the laminated portions 52 can easily deform. In this manner, the flexibility of the flexible bus bar 50 can be improved.

Fifth Embodiment

Figure 11:
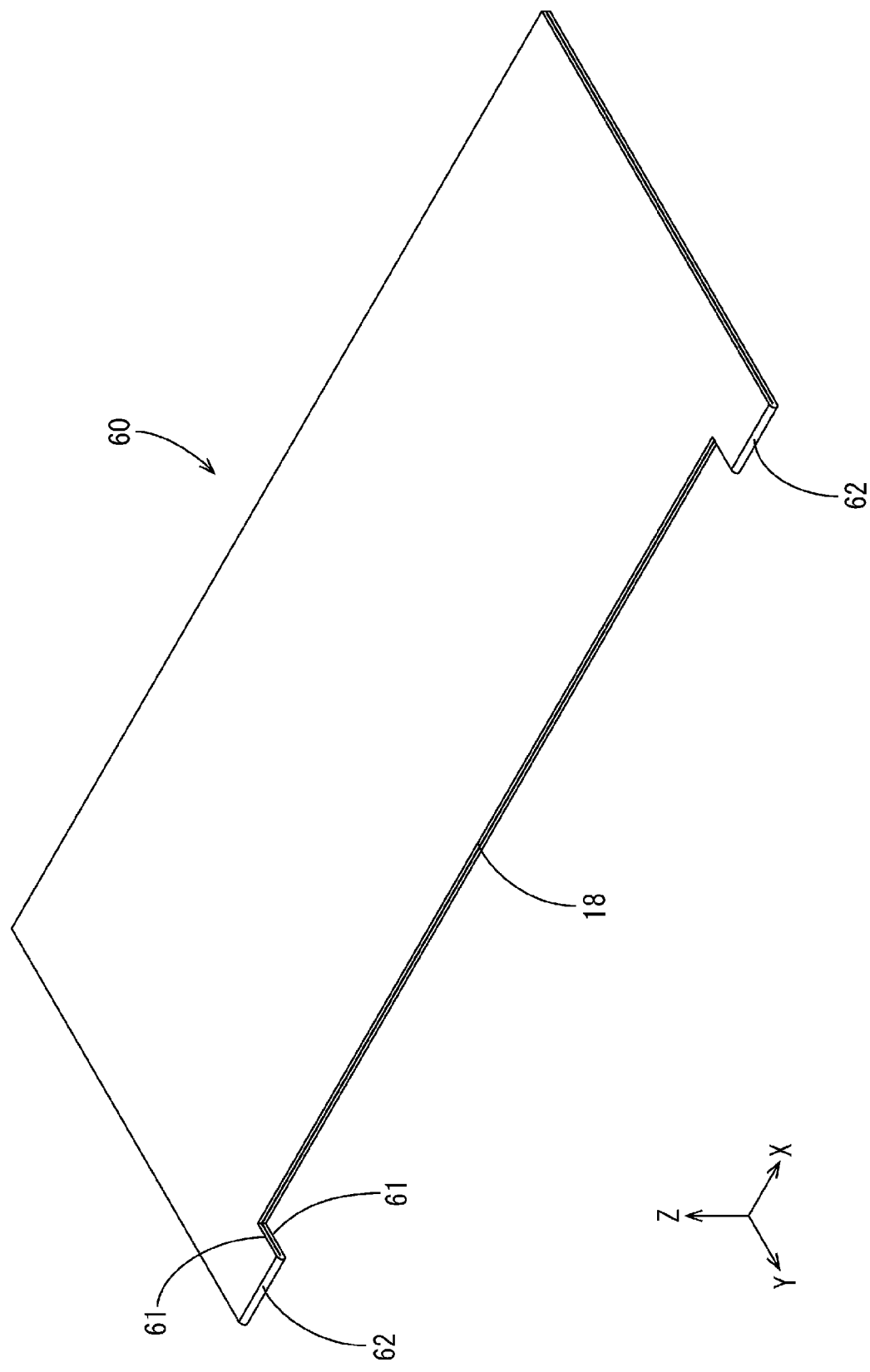
FIG. 11 is a perspective view showing a flexible bus bar according to a fifth embodiment.
Figure 12:
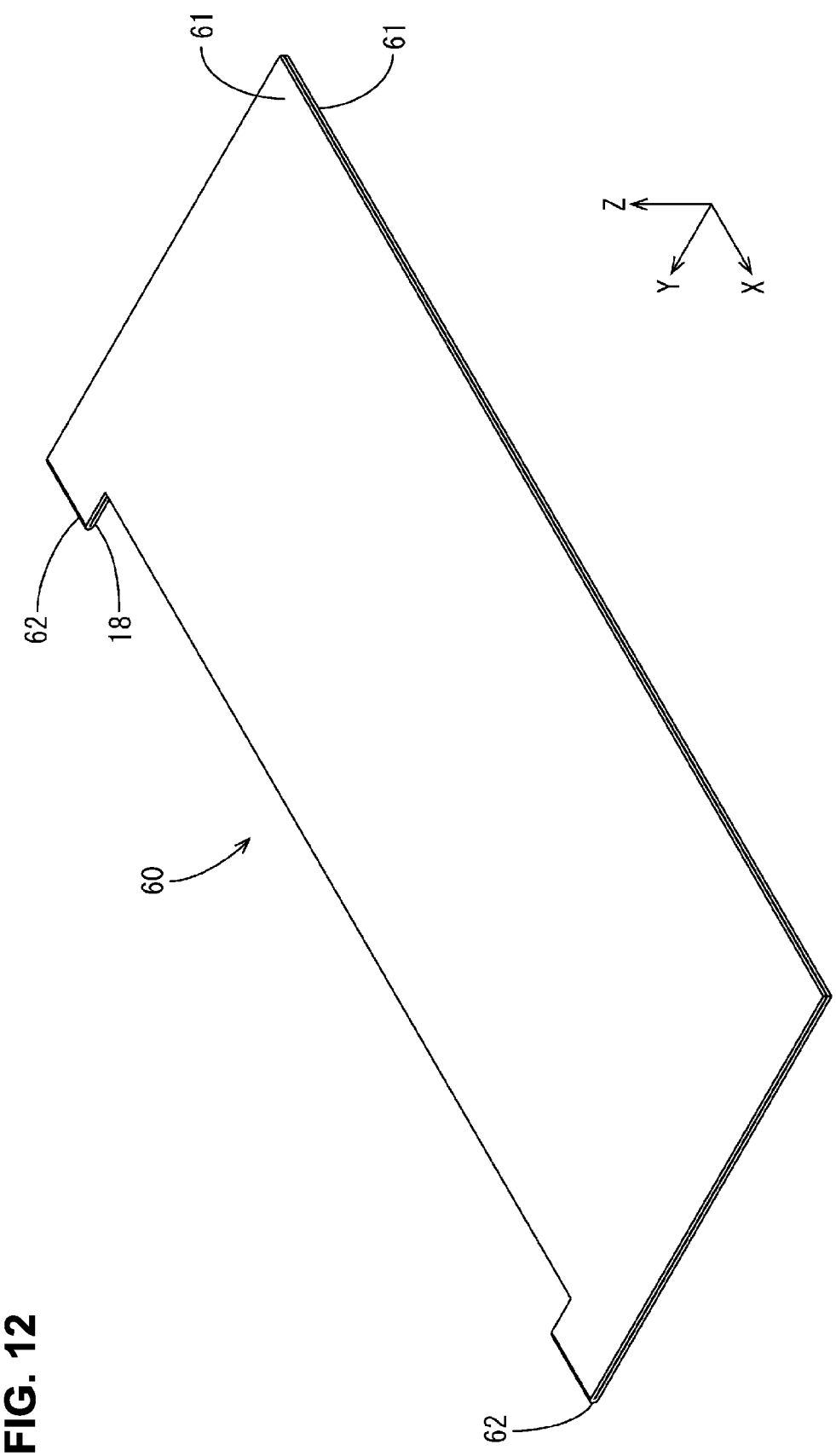
FIG. 12 is a perspective view showing the flexible bus bar as seen from a different angle from that of FIG. 11.

Next, a fifth embodiment of a flexible bus bar 60 according to the present disclosure will be described with reference to FIGS. 11 and 12. The flexible bus bar 60 according to the present embodiment is formed by folding one metal plate member in half. The flexible bus bar 60 according to the present embodiment has two laminated portions 61. Folded portions 62 are respectively formed at positions near the front and rear end portions of the right side edge of the laminated portions 61. The flexible bus bar 60 according to the present embodiment does not have a bent portion 16.

The configuration other than that described above is substantially the same as the first embodiment, and the same members are given the same reference signs, and the redundant description is omitted.

According to the present embodiment, since the structure of the flexible bus bar 60 can be simplified, the material cost can be reduced. Also, since the folding step can be eliminated, the manufacturing cost can be reduced. Also, the weight of the flexible bus bar 60 can be reduced.

Other Embodiments (1) The folded portions may be formed at any side edge of the laminated portions.

(2) There is no limitation on the number of power storage elements included in one power storage module.

(3) The power storage elements may be connected in series or in parallel. Also, serial connection and parallel connection may also be mixed.

(4) The power storage elements may also be capacitors.

(5) The flexible bus bar may also include a plurality of bent portions. The bent portions may be bent downward in the shape of a protrusion.

(6) There is no limitation on the number of layers formed by the laminated portions.

LIST OF REFERENCE NUMERALS

1 Vehicle
2 Power storage pack
3 PCU
4 Wire harness
10, 33, 40 50, 60 Flexible bus bar
11, 30 Power storage module
12 Power storage element
13 Electrode terminal
14, 42, 52, 61 Laminated portion
15, 41, 51, 62 Folded portion
16 Bent portion
17 Linking portion
18 Cut portion
19 Metal plate member
20 Dashed-dotted line
31 Composite bus bar
32 End portion bus bar
35 Power storage pack

The invention claimed is:

1. A flexible bus bar comprising:
    at least one folded portion in which one metal plate member is folded; and
    a plurality of laminated portions that are laminated via the folded portion,
    wherein side edges of the plurality of laminated portions provided with the folded portion include a cut portion from which a portion other than the folded portion is cut, and
    the folded portion is formed at a portion near an end portion of a side edge provided with the folded portion, of the side edges of the plurality of laminated portions.

2. The flexible bus bar according to claim 1,
    wherein the metal plate member includes a plurality of the folded portions as a result of the metal plate member being folded two or more times.

3. The flexible bus bar according to claim 1,
    wherein a bent portion that is bent, in the shape of a protrusion, in a direction intersecting a thickness direction of the plurality of laminated portions is formed in the plurality of laminated portions.

4. The flexible bus bar according to claim 1, wherein the flexible bus bar is a vehicle bus bar to be mounted and used in a vehicle.

5. A composite bus bar comprising:
    the flexible bus bar according to claim 1, and
    an end portion bus bar that is connected to an end portion of the flexible bus bar.

6. The composite bus bar according to claim 5, wherein the composite bus bar is a vehicle bus bar to be mounted and used in a vehicle.

7. A power storage pack comprising:
    the composite bus bar according to claim 5; and
    a power storage module including a plurality of power storage elements,
    wherein the end portion bus bar of the composite bus bar is connected to an external output terminal of the power storage module.

8. A power storage pack according to claim 7, wherein the power storage pack is a vehicle power storage pack to be mounted and used in a vehicle.

9. A method for manufacturing a flexible bus bar, comprising:
    forming a plurality of laminated portions by folding one metal plate member to form a linking portion; and
    performing cutting so as to leave a portion of the linking portion and thereby form a folded portion using the remaining portion of the linking portion.

* * * * *